United States Patent [19]

Just-Hänig

[11] Patent Number: 4,846,663
[45] Date of Patent: Jul. 11, 1989

[54] APPARATUS FOR TRANSFERRING PARISONS FROM A CONVEYING PATH TO A RECEIVING WHEEL

[75] Inventor: Christian Just-Hänig, Mülheim am der Ruhr, Fed. Rep. of Germany

[73] Assignee: Krupp Corpoplast Maschinenbau GmbH, Hamburg, Fed. Rep. of Germany

[21] Appl. No.: 164,240

[22] Filed: Mar. 4, 1988

[51] Int. Cl.[4] .............................................. B29C 49/42
[52] U.S. Cl. .................................... 425/534; 198/404;
198/408; 264/538; 264/542; 264/543
[58] Field of Search ............... 425/534; 264/538, 542, 264/543; 198/404, 408

[56] References Cited

U.S. PATENT DOCUMENTS

| 2,676,740 | 4/1954 | Birkland | 198/404 X |
| 3,374,752 | 3/1968 | Shirozu | 198/408 X |
| 3,581,866 | 6/1971 | Hottendorf | 198/404 |
| 3,778,213 | 12/1973 | Settembrini | 264/543 X |
| 3,872,203 | 3/1975 | Yoshikawa et al. | 264/543 X |
| 4,036,925 | 7/1977 | Kauffman et al. | 264/543 X |
| 4,505,372 | 3/1985 | Sato | 198/404 |
| 4,693,375 | 9/1987 | Schweers | 425/534 X |

FOREIGN PATENT DOCUMENTS

| 84943 | 5/1958 | Denmark | 198/408 |
| DE291640 | 11/1982 | Fed. Rep. of Germany . | |

Primary Examiner—Richard L. Chiesa
Attorney, Agent, or Firm—Harness, Dickey & Pierce

[57] ABSTRACT

An apparatus for transferring parisons used for blow moulding and consisting of plastic from a conveying path to a receiving wheel. For this purpose, a transfer wheel is provided which receives the parisons in compartments, turns them through 180° and transfers them in modified orientation to a receiving wheel.

34 Claims, 2 Drawing Sheets

APPARATUS FOR TRANSFERRING PARISONS FROM A CONVEYING PATH TO A RECEIVING WHEEL

BACKGROUND OF THE INVENTION

The invention relates to an apparatus for transferring parisons from a conveying path to a receiving wheel.

Such parisons or preforms made from plastic are heated and blow-moulded to form hollow articles. The transport of the parisons or preforms through the heating and blowing stations is with rotatable wheels on the outer periphery of which pockets or receivers are disposed for holding the parisons. If the parisons are made in an apparatus preceding the blow moulding in which the parison is provided for example by injection moulding or remoulding with a bottom and a mouth region, the parisons must be supplied to the heating and blowing stations. For this purpose the parisons are moved standing or hanging along a conveying path and must be transferred from the conveying path to a receiving wheel.

The problem underlying the invention resides in further developing the apparatus of the type outlined at the beginning so that the parisons or preforms can be reliably singled, gripped and individually transferred to the receiving wheel. The apparatus is also to be able to operate at high speed and be of simple construction.

SUMMARY OF THE INVENTION

Thus according to the invention between the conveying path and the receiving wheel a transfer wheel is provided which is constructed in the manner of a fan wheel. The transfer wheel is provided with fingers which cooperate with the end of the conveying path and in each case receive a single parison and guide it into a cage which is formed by the fingers and guides arranged fixed with respect to the housing. This ensures that always only a single parison is removed from the conveying path and enclosed in the cage. The continuously rotatably driven transfer wheel now transports the parisons individually to the receiving wheel which is arranged on the side of the transfer wheel opposite the fingers. According to the invention it is possible to accelerate the parisons from their movement on the conveying path almost smoothly to the speed of the transfer wheel and deposit them in continuation of the movement on the receiving wheel.

A particular advantage of the apparatus according to the invention resides in that each parison in the course of the transport path on the transfer wheel is turned through preferably 180°, i.e., the bottom of the parison directed vertically downwardly in the conveying path on rotation of the transfer wheel through 180° moves to the top and is inserted in this position into the receiving wheel. Thus, according to the invention the singling out and turning of the parisons is carried out in one stage.

It should be noted in this connection that in the example of embodiment described below the parisons are provided with a mouth region which has a collar, i.e. a flange, which projects beyond the mean diameter of the tubular parison. If the operation is with such parisons it is particularly advantageous to guide the parisons in the conveying path suspended, the support rings on the parisons on either side being carried by guide rails. Since the centre of gravity of the parisons lies beneath the guide rails no jamming of the parisons in the conveyor can take place. It is however also possible to transport the parisons standing upright in the conveying path, corresponding support and guiding being provided. The transfer wheel can reliably single out, turn and supply to the receiving wheel parisons with or without support ring.

An example of embodiment of the invention will be explained in detail hereinafter with the aid of the drawings, wherein:

Figure 1:
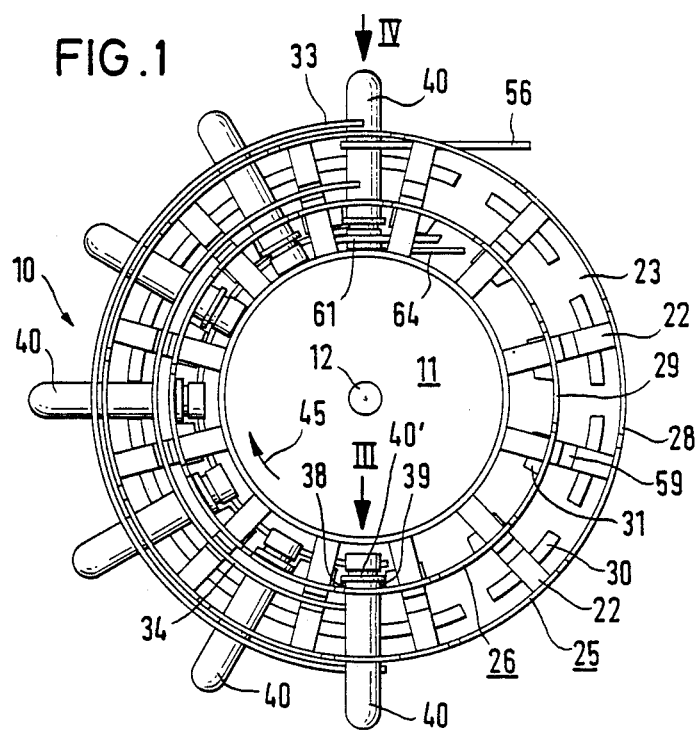
FIG. 1 is an end view of the transfer wheel.

DETAILED DESCRIPTION OF THE PREFERRED EMBODIMENT .

Firstly, the transfer wheel 10 illustrated in FIGS. 1 and 2 will be explained. The transer wh eel 10 consists of a hub 11 which is mounted on a horizontally arranged shaft 12. The shaft 12 is rotatably mounted with bearings 13 and 14, the components necessary for the bearings on the housing side not being shown, and carries a bevel gear 15 which meshes with a further bevel gear 16 which is secured on a perpendicularly disposed shaft 17 which is mounted inter alia at 18 and driven in a manner not illustrated. The receiving wheel 20 is mounted on the shaft 17.

The hub 11 of the transfer wheel 10 is provided with radially extending supports 22 arranged at uniform circumferential intervals. In the example of embodiment twelve supports 22 are provided. The spaces between the supports are each free.

Secured to the supports 22 at the outer periphery and within the outer periphery are a row 25 and 26 respectively of fingers 28 and 29 respectively arranged individually at intervals in the circumferential direction. The finger rows are cylindrically formed. The fingers 28 and 29 can be cut individually from metal sheets; they may also however be cut out of a sheet metal cylinder. The form of the fingers is apparent in particular from the plan view of FIG. 3.

On the side of the transfer wheel 10 remote from the fingers runners or skids 30 and 31 are arranged at the rear side on the supports 22. In each case one runner 30 is arranged radially between the outer and inner finger row 25, 26 and the respective second runner 31 within the inner finger row 26.

Below the guides fixed with respect to the housing will be explained, said guides preventing the parisons held between the fingers from dropping out laterally and holding and guiding the parisons together with the fingers in a cage. For this purpose on the front side of the transfer wheel 10 an outer guide 33 and an inner guide 34 are provided in the form of a ring segment in each case. The guides 33 and 34 are mounted on the housing, which is not illustrated. The outer guide 33 lies outside the outer finger row 25 whilst the inner guide 34 is arranged between the two finger rows. Furthermore, on the side of the transfer wheel 10 remote from the fingers an outer guide 35 and an inner guide 36 are likewise arranged fixed with respect to the housing, each in the form of a ring segment. The facing edges of the guides 33 to 36 have a spacing which is somewhat greater than the diameter of a parison 40.

Figure 2:
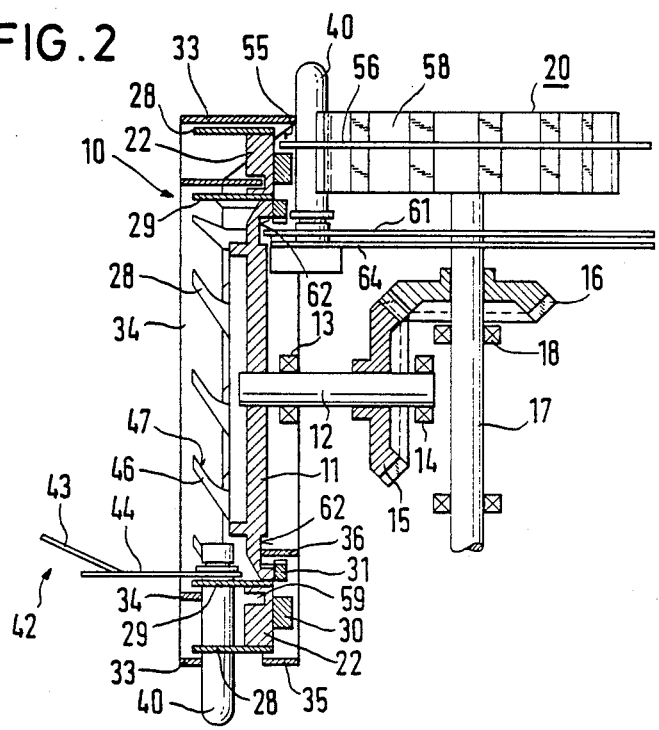
FIG. 2 is a side view of the transfer wheel according to FIG. 1 in section with a side view of the receiving wheel.
Figure 3:
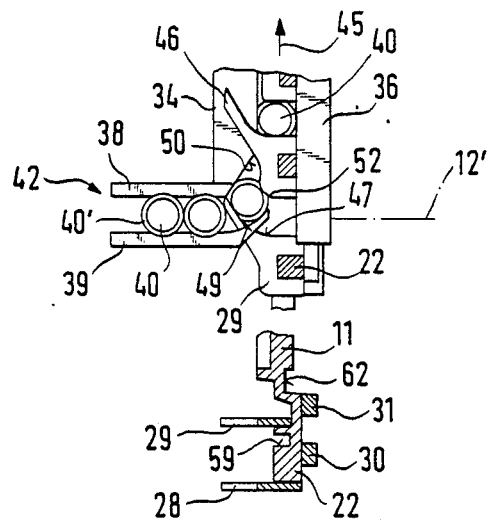
FIG. 3 is a plan view of the input station of the transfer wheel seen in the direction of the arrow 3 in FIG. 1

The transporting of a parison in the transfer wheel 10 is illustrated in FIG. 3: a parison 40 is guided on both sides at the longitudinal edges of the guides 34 and 36 and held between two consecutive fingers 29. The guides 34, 36 together with the fingers 29 form a cage in which the parison is enclosed. On rotation of the transfer wheel 10 the parison wheel 40 is moved along the guides, passing from the input station illustrated in FIG. 3 into the delivery station apparent in particular in FIG. 2.

The parison 40 is held and guided in corresponding manner by the outer finger row 25 with the fingers 38 together with the outer guides 33 and 35 on both sides. This prevents tilting and jamming of the parison in the transfer wheel.

FIG. 3 illustrates a plan view of the input station. The axis of rotation of the transfer wheel is denoted by 12'. The conveying path 42 consists of two parallel rails 38 and 39 on which the parisons 40 advance, passing from an inclined portion 43 into an accumulation section 44 in front of the input station. The parisons 40 are arranged hanging and each have a collar 40' which is carried by the rails 38 and 39.

If the transfer wheel 10 rotates in the direction of the arrow 45 the narrow end 46 of the finger 29 and also the outer finger 28, not visible in FIG. 3, engage between the first and second parison in the conveying path. On continued rotation of the transfer wheel the parison is thereupon guided along the curved edge 47 of the finger 29 inwardly in the direction towards the guide 36. To permit and assist this movement the rail 39 of the conveying path 42 is curved at 49 and the guide 34 has an end-side ramp 50.

Thus, on introduction into the transfer wheel the parison is supported several times at its periphery, i.e. by the curve path 47 of the finger 29 dividing and singling out the parison, by the rear side 52 of the leading finger 29, by the ramp 50 of the guide 34 and by the curved portion 49 of the rail 39.

The parison is thus drawn into the cage without losing the support and is then subsequently further transported. The parison is again secured against radial dropping out by its collar 40' which is carried by the fingers 29.

The input station is arranged according to FIG. 1 in the six o'clock position of the transfer wheel 10. The delivery station illustrated in FIG. 1 lies in the 12 o'clock position of the transfer wheel so that each parison is turned during the transport from the 6 o'clock position to the 12 o'clock position through 180°.

Figure 4:
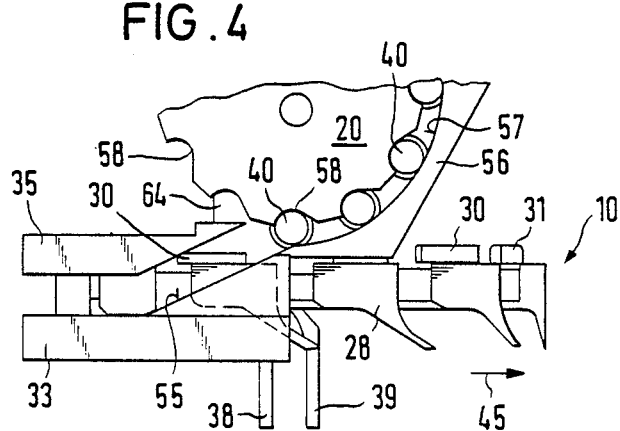
FIG. 4 is a plan view of the receiving wheel and the delivery station of the transfer wheel seen in the direction of the arrow 4 of FIG. 1.

In the delivery station illustrated in FIG. 4 each parison must be displaced in the axial direction in the direction towards the rearwardly disposed receiving wheel 20 and brought into the region of said receiving wheel 20.

For this purpose the outer guide 33 is provided with a ramp 55 which is extended in the axial direction beyond the outer periphery of the transfer wheel 10. The extension of this ramp 55 is formed by a guide rail 56 which is provided with a profile 57 which serves as director for the parisons 40 and which holds parisons in the pockets 58 arranged at the periphery of the receiving wheel 20.

The inner finger-side guide 34, not visible in FIG. 4, is also extended in accordance with FIG. 2 in the axial direction in the region of the transfer station and engages with clearance into a corresponding recess 59 in each support 22 of the transfer wheel 10. The guide 34 is also provided with a corresponding ramp not shown in the drawing and serving the same purpose as the ramp 55 of the guide 33.

In addition, spaced from the guide rail 56 a further guide rail 61 is provided radialy within the inner finger row 26 in the region of the receiving wheel 20 and the form thereof corresponds to the profile 57 of the upper guide rail 56. The guide rail 61 is extended in the axial direction of the transfer wheel 10 and engages into a recess 62 of the transfer wheel. This provides a smooth transfer of the parison from the ramp of the finger-side inner guide 34 to the profile of the guide rail 61.

During turning of the parisons the latter move radially inwardly under the action of gravity. They bear thereby on a support plate 64 which is provided beneath the guide rails 56, 61 laterally on the receiving wheel and is secured on the housing side. The delivery of the parisons from the transfer wheel is as follows: on rotation of the transfer wheel in the direction of the arrow 45 the parisons included in the cages move along the ramp 55 of the guide 33 and the corresponding ramp on the guide 34 and are displaced in the axial direction towards the receiving wheel 20. As soon as the parisons have reached the rear side of the transfer wheel they are taken over by the guide rails 56 and 61 disposed there. When this is done by the runners 30 and 31 arranged on the rear side of the individual supports are effective and on the moving past further push the parison pushed out of the leading cage so that it moves into the receiving region of the pockets 58 of the receiving wheel and is thereafter held and guided therein by the directors 56 and 61.

In the embodiment illustrated the receiving wheel 20 is a wheel arranged laterally of a working wheel which also serves as input wheel for the working wheel.

Instead of the inclined portion 43 the backup pressure necessary in the section 44 in front of the fingers can also be generated in another manner, for example by blasting from air nozzles or frictional bands.

I claim:

1. Apparatus for transferring parisons from a conveying path to a receiving wheel, the parisons being aligned in the conveying path parallel to each other and insertable into the rotatably driven receiving wheel at predetermined peripheral intervals, characterized in comprising a transfer wheel having its rotational axis perpendicular to the axis of the incoming parisons and of the outgoing parisons, said transfer wheel being formed with radially extending compartments, each of said compartments being provided with fingers on the sides of incoming parisons, guides fixed with respect to said transfer wheel for guiding a parison into a one of said compartments, said fingers and said guides being arranged in a plurality of circumferential rows concentric with the rotational axis of said transfer wheel, and means for displacing a parison out of the compartment into said receiving wheel.

2. Apparatus according to claim 1, characterized in that the conveying path is arranged to project into the region of the fingers and the receiving wheel in a region remote from the fingers.

3. Apparatus according to claim 1, characterized in that the transfer wheel comprises radial supports on which the fingers are secured.

4. Apparatus according to claim 3, characterized in that a stationary guide is arranged axially on opposite sides of the supports.

5. Apparatus according to claim 1, characterized in that the fingers engage between the parisons in the conveying path.

6. Apparatus according to claim 1, characterized in that the fingers are curve-shaped on their front side in the direction of rotation of the transfer wheel for guiding the parison into the compartment.

7. Apparatus according to claim 6, characterized in that the guide profile of the fingers is spiral shaped.

8. Apparatus according to claim 1, characterized in that the peripheral interval between the fingers corresponds substantially to the division of the receiving wheel.

9. Apparatus according to claim 1, characterized in that the finger ends are tapered.

10. Apparatus according to claim 1, characterized in that the side edges of the guides lying in the region of the fingers are provided with a slope in the conveying direction for introducing the parisons into the compartment.

11. Apparatus according to claim 1, characterized in that the spacing between the guides corresponds substantially to the diameter of the parisons.

12. Apparatus according to claim 11, characterized in that axial displacement of each parison in each compartment is performed by two circumferentially consecutive fingers and a guide on either side of the transfer wheel, the finger-side guide being axially widened in the transfer region and provided with a ramp.

13. Apparatus according to claim 1, characterized in that a row of fingers is arranged on an outer and an inner radius of the transfer wheel.

14. Apparatus according to claim 13, characterized in that each row of fingers on either side of of the transfer wheel has associated therewith a stationary guide.

15. Apparatus according to claim 14, characterized in that the guides are ring segments.

16. Apparatus according to claim 15, characterized in that the outer finger-side guide is arranged radially outside the outer finger row.

17. Apparatus according to claim 16, characterized in that the inner finger-side guide is arranged radially outside the inner finger row.

18. Apparatus according to claim 17, characterized in that axial displacement of the parisons is performed by the inner finger-side guide engaging with its axially widened end provided with a ramp into a finger-side recess of supports of the transfer wheel.

19. Apparatus according to claim 1, characterized in that on the side of the transfer wheel remote from the fingers at least one fixed guide is arranged which overlaps a finger-side guide.

20. Apparatus according to claim 19, characterized in that the guide remote from the fingers overlaps the radially outer finger-side guide.

21. Apparatus according to claim 20, characterized in that the guide remote from the fingers is provided to direct the parisons into pockets of the receiving wheel and to hold the parisons therein.

22. Apparatus according to claim 21, characterized in that the guide is a guide rail.

23. Apparatus according to claim 22, characterized in that the parisons are held by the guide in radially open pockets of the receiving wheel.

24. Apparatus according to claim 19, characterized in that the parisons are supported in the region of the receiving wheel by a support plate.

25. Apparatus according to claim 19, characterized in that at a distance from the guide remote from the fingers a second radially inwardly offset guide is mounted, said offset guides having an end facing the transfer wheel to engage into a recess in the supports of the transfer wheel.

26. Apparatus according to claim 25, characterized in that the second guide is also formed to direct the parisons in pockets of the receiving wheel.

27. Apparatus according to claim 1, characterized in that the transfer wheel comprises skids or runners with which the parisons can be pushed into the region of the receiving wheel and which face the latter.

28. Apparatus according to claim 1, characterized in that the conveying path is constructed for suspended transporting of the parisons.

29. Apparatus according to claim 28, characterized in that the conveying path comprises two rails which support the parisons and the ends of which overlap the finger-side guides nd the fingers.

30. Apparatus according to claim 1, characterized in that the transfer wheel is rotatable about a horizontal axis.

31. Apparatus according to claim 30, characterized in that the receiving wheel is rotatable about a vertical axis.

32. Apparatus according to claim 31, characterized in that the conveying path is arranged at the transfer wheel perpendicularly beneath the diametrically offset receiving wheel.

33. Apparatus according to claim 32, characterized in that the rotations of the transfer wheel and the receiving wheel are synchronized with each other.

34. Apparatus according to claim 33, characterized in that the transfer wheel is coupled to the receiving wheel via a bevel gear mechanism.

* * * * *